United States Patent Office 2,727,256
Patented Dec. 20, 1955

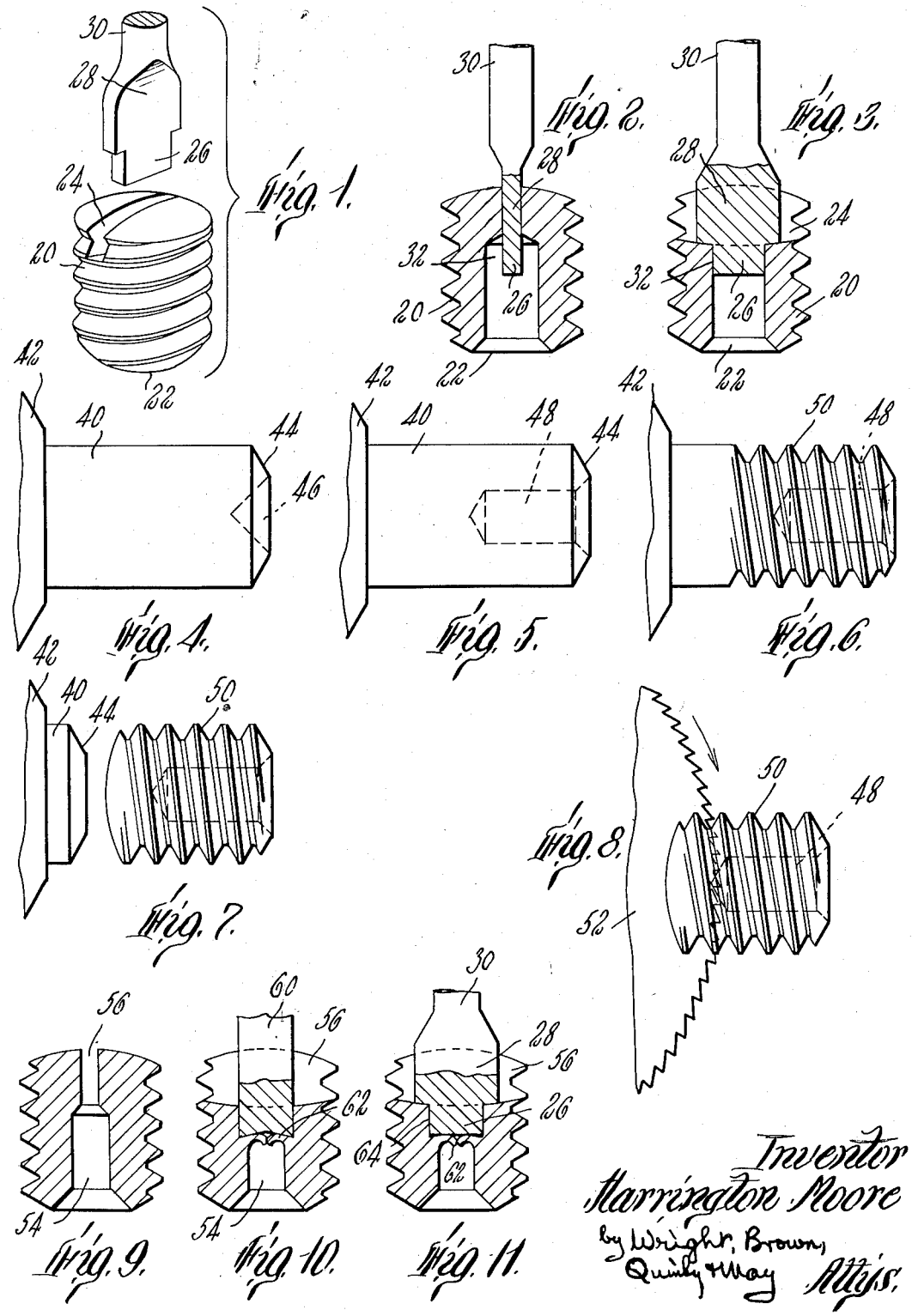

2,727,256

METHOD OF MAKING SET SCREWS

Harrington Moore, East Acton, Mass.

Application May 27, 1953, Serial No. 357,750

1 Claim. (Cl. 10—10)

This invention relates to an improved headless set screw and to methods of making the same.

The ordinary headless set screw has a transverse slot in the end opposite the cupped end to receive the blade of a screwdriver. Another type of headless screw has an axial hexagonal socket to receive a driving tool with a mating hexagonal end. The latter set screw can be set up tighter than the former since there is no danger of the tool slipping out of the socket and the effort exerted on the tool can be entirely torque-producing. In the case of the common set screw, the operator must exert an axial push on the tool as he turns it and must also exercise care to avoid side slip of the blade out of an end of the slot. The screw with the hexagonal socket, however, costs more to make. It is an object of the present invention to provide a set screw which will have the mechanical advantages of the socket screw but which can be made at substantially the same cost as a common screw by utilizing the automatic machines generally used in the production of the common screw.

According to the invention, the improved screw is made with a deep slot and an opening or recess in the central portion of the bottom of the slot at its end, so that when the blade of a special screwdriver with a tongue projecting from the blade is inserted in the slot the tongue will enter the opening or recess and will thus prevent edgewise slip of the blade.

Headless set screws are customarily made in automatic machines which operate on the leading end portion of a rod of indefinite length. The machine first forms a cup in the leading end of the rod to provide a sharp bearing edge in the form of a circle. A screw thread is then cut on the outer surface of the leading portion of the rod, and a screw is severed from the rod and transferred to a slot cutter which cuts a slot across the tool receiving end. The automatic machine by which most of the work is done in fashioning the screw is in the nature of a turret lathe, successive tools being advanced to operate on the leading end portion of the rod stock which is gripped by a rotating chuck. Hence it is advantageous and economical to perform all the turning operations while the screw is held by the chuck. After the screw has been cut off, it is held by a pick-up arm while a saw cuts a transverse slot in an end thereof to receive a screwdriver blade.

According to the present invention, after a center cup has been made in the leading end of the rod stock gripped by the chuck, an axial hole is drilled inward from the cup end, this hole or bore being of a length sufficient to be reached by the saw-cut which is subsequently made. The bore thus furnishes the recess to receive the tongue which projects from the blade of the screwdriver.

An alternative method of providing a recess for the screwdriver tongue is to drill an axial hole of lesser diameter than the width of the tongue; then after the saw-cut has been made, insert a broach in the form of a blade slightly wider than the tongue. The broach cuts away chips from the sides of the bore and forms what amounts to a deeper central portion of the slot. In this case, the tongue not only centers the blade in the slot but also exerts torque on the screw when the screwdriver is turned.

For a more complete understanding of the invention reference may be had to the following description thereof and to the drawing of which—

Figure 1 is a perspective view of a headless screw embodying the invention, together with the blade of a special screwdriver for use therewith;

Figure 2 is a longitudinal sectional view of the screw shown in Figure 1, the screwdriver being shown inserted in the slot of the screw;

Figure 3 is a sectional view similar to Figure 2 but on a plane at right angles thereto;

Figure 4 is a side elevation of a portion of a length of rod stock projecting from a chuck, the leading end having been centered;

Figure 5 is an elevational view similar to Figure 4, indicating a central bore into the end portion of the rod;

Figure 6 is a similar view showing an external screw thread;

Figure 7 is a similar view showing the screw cut off from the stock;

Figure 8 is a side elevation of the screw showing the saw cutting a slot in the end thereof;

Figure 9 is a longitudinal section of a partially finished modified form of a headless screw;

Figure 10 is a sectional view of the same on a different longitudinal plane showing the action of a broaching tool; and Figure 11 is similar to Figure 10 but shows a screwdriver in place of the broaching tool.

Figures 1, 2 and 3 show one form of a headless screw 20 embodying the invention, this screw having a cupped end 22 and a deep transverse slot 24 in the other end. As indicated in Figure 3, the mid portion of the bottom of the slot is recessed to receive a tongue 26 projecting from the blade 28 of a screwdriver 30. The tongue 26 is of substantially the same thickness as the blade 28 but is narrower to fit into the recess 32 in the bottom of the slot 24. This prevents any possibility of the screwdriver blade slipping laterally from the slot so that the operator can concentrate on exerting torque on the screwdriver instead of wasting effort in an attempt to maintain the blade within the slot.

According to the invention the recess 32 is formed by drilling a hole or bore axially from the cupped end 22, this hole being of sufficient depth to be intersected by the subsequently made saw-cut which forms the transverse slot 24.

The successive steps employed in making a set screw of the kind described are illustrated in Figures 4 to 7. A piece of rod stock 40 of indefinite length is gripped in a rotating chuck 42 and projects outward therefrom. Screws are severed successively therefrom as the turning operations on them are completed. The cutting-off tool is of such shape as to bevel the edge of the projecting end as at 44 in the process of severing a screw from the rod. The end of the rod is presented to a centering tool which forms the usual cup or conical depression 46 in this end. The end is then presented to a drill having a diameter slightly greater than the width of the tongue 26 on the screwdriver blade. This drill bores an axial hole 48 to a predetermined depth. A suitable die then cuts a screw thread 50 on the exterior surface of the projecting end portion 40 of the rod and the screw is then cut off as indicated in Figure 7. When the screw has been cut off, it is seized by a pick-up arm (not shown) and presented to a circular saw 52 which cuts a deep transverse slot in the end of the screw opposite the cupped end. This slot which is cut by the saw intersects the inner end of the hole 48 so that the hole becomes the recess into which the tongue 26 of the screwdriver can project.

In carrying out the process described above for making a headless screw, the additional step of drilling an axial hole to provide a recess in the bottom of the slot is performed on the automatic machine on which all the turning operations are performed so that the additional time and cost required is negligible.

A modified form of screw is shown in Figures 9, 10 and 11. The screw is first centered, drilled, and screw threaded as hereinbefore described, the diameter of the hole 54 being less than the width of the tongue 26. After the screw has been removed from the turning machine and after a saw-cut 56 has been made to intersect the hole a broaching tool 60 is inserted in the slot axially and is forced inward so as to cut a recess in the bottom of the slot by pushing chips 62 from the side walls of the bore as indicated in Figure 10. The tool 60 forms a recess 64 in the bottom of the slot to receive the tongue 26 of the screwdriver 30. When the screwdriver is turned, portions of the faces of the tongue 26 bear against sides of the vertical grooves gouged by the broach. The tongue thus assists the blade in exerting torque on the screw.

I claim:

A method of making a headless setscrew, which comprises centering an end of a piece of rod stock, drilling an axial hole in from said end, cutting an external screw thread on said piece, cutting off the threaded portion at a point beyond the inner end of said hole, cutting a transverse slot in the other end of sufficient depth to intersect said hole, and broaching short opposed grooves in the walls of said hole, said grooves lying in a plane parallel to the slot, said broaching action proceeding from the bottom of the slot progressively into said hole.

References Cited in the file of this patent

UNITED STATES PATENTS

| | | |
|---|---|---|
| 1,153,488 | Hallowell | Sept. 14, 1915 |
| 1,260,138 | Brown | Mar. 19, 1918 |
| 1,372,291 | Jacobs | Mar. 22, 1921 |
| 1,410,088 | White | Mar. 21, 1922 |
| 1,970,216 | Bechler | Aug. 14, 1934 |
| 2,239,352 | Cherry | Apr. 22, 1941 |
| 2,398,343 | Wyrick | Apr. 9, 1946 |
| 2,408,267 | Moore | Sept. 24, 1946 |